(12) United States Patent
Hardee et al.

(10) Patent No.: US 11,067,400 B2
(45) Date of Patent: Jul. 20, 2021

(54) REQUEST AND PROVIDE ASSISTANCE TO AVOID TRIP INTERRUPTION

(71) Applicant: International Business Machines Corporation, Armonk, NY (US)

(72) Inventors: Christopher J. Hardee, Raleigh, NC (US); Jeremy A. Greenberger, San Jose, CA (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/203,698

(22) Filed: Nov. 29, 2018

(65) Prior Publication Data

US 2020/0173795 A1 Jun. 4, 2020

(51) Int. Cl.
*G01C 21/34* (2006.01)
*G07C 5/00* (2006.01)
*G06Q 50/30* (2012.01)
*G06Q 30/02* (2012.01)
*G08G 1/00* (2006.01)
*G07C 5/08* (2006.01)

(52) U.S. Cl.
CPC ..... *G01C 21/3438* (2013.01); *G06Q 30/0283* (2013.01); *G06Q 50/30* (2013.01); *G07C 5/008* (2013.01); *G07C 5/0808* (2013.01); *G08G 1/202* (2013.01)

(58) Field of Classification Search
None
See application file for complete search history.

(56) References Cited

U.S. PATENT DOCUMENTS

| | | | |
|---|---|---|---|
| 8,190,322 B2 | 5/2012 | Lin et al. | |
| 9,053,588 B1 * | 6/2015 | Briggs | G07C 5/006 |
| 9,368,026 B1 | 6/2016 | Herbach et al. | |
| 9,412,130 B2 | 8/2016 | Wasserman et al. | |
| 9,773,281 B1 * | 9/2017 | Hanson | H04W 4/023 |
| 9,817,400 B1 | 11/2017 | Poeppel et al. | |
| 2008/0177653 A1 | 7/2008 | Famolari et al. | |

(Continued)

OTHER PUBLICATIONS

"The Google Driverless Car Can Diagnose itself on Its Own", whatafuture.com, Aug. 22, 2014, <http://www.whatafuture.com/self-diagnosis-by-google-driverless-car/>, 7 pages.

(Continued)

*Primary Examiner* — Tamara L Weber
(74) *Attorney, Agent, or Firm* — Monchai Chuaychoo

(57) ABSTRACT

Embodiment of the present invention provides a systems and methods for completing travel plans after a personal vehicle failure. The system receives a request from a disabled vehicle and determines at least a first destination of one or more users associated with the disabled vehicle based on user input. Then the system determines a second destination of the disabled vehicle based on the user input and analyzes the user input and generating a list of rescue plans. Then it transmits the list of rescue plans to the one or more users and receives a selection by the user. Furthermore, it sends instructions to a service provider associated with the selected rescue plan to deliver the one or more users to the first destination and the disabled vehicle to the second destination.

20 Claims, 4 Drawing Sheets

(56) References Cited

U.S. PATENT DOCUMENTS

| | | | |
|---|---|---|---|
| 2012/0136802 A1 | 5/2012 | McQuade et al. | |
| 2013/0339062 A1* | 12/2013 | Brewer | H04W 4/021 |
| | | | 705/4 |
| 2015/0046080 A1* | 2/2015 | Wesselius | G08G 1/202 |
| | | | 701/428 |
| 2015/0339928 A1 | 11/2015 | Ramanujam | |
| 2016/0247109 A1 | 8/2016 | Scicluna et al. | |
| 2016/0364678 A1* | 12/2016 | Cao | G06Q 50/30 |

OTHER PUBLICATIONS

Creighton, Jolene, "Uber's Self-Driving Taxis Have Hit the Streets", futurism.com, Artificial Intelligence, <https://futurism.com/breaking-ubers-self-driving-taxis-have-hit-the-streets/>, Sep. 14, 2016, 5 pages.

Lunden, Ingrid, "IBM's Watson makes a move into self-driving cars with Olli, a minibus from Local Motors", techcrunch.com, Jun. 16, 2016, <https://techcrunch.com/2016/06/16/ibms-watson-makes-a-move-into-self-driving-cars-with-olli-a-minibus-from-local-motors/>, 2 pages.

Mendoza, Sherly, "On-Board Diagnostics: The future of vehicle analysis", Telematics.com, <https://www.telematics.com/board-diagnostics-future-vehicle-analysis/>, Apr. 6, 2014, 8 pages.

\* cited by examiner

US 11,067,400 B2

REQUEST AND PROVIDE ASSISTANCE TO AVOID TRIP INTERRUPTION

BACKGROUND OF THE INVENTION

The present invention relates generally to the field of vehicle transportation and more particularly to assistance of disabled vehicle during a trip.

Vehicle trips are often interrupted or delayed by mechanical issues with the vehicle. Sometimes, those delays can be detrimental especially if the occupant must complete the trip in a specific time frame. Questions often arise on what to do and where to take the broken-down vehicle.

Autonomous vehicles will be pervasive in a few years. Almost all the major automakers have targets for when they will have autonomous vehicles of a sufficient level on the market. In addition, companies interested in shipping, delivery and transportation are also developing solutions or planning to integrate them. However, delays to the trip with autonomous vehicles is still the same as issues regarding non-autonomous vehicles.

Therefore, realizing a need for an uninterrupted trip is an interest in the transportation industry.

SUMMARY

According to one embodiment of the present invention, a method is provided. The method for completing travel plans after a personal vehicle failure, the method comprising: receiving a request from a disabled vehicle; determining at least a first destination of one or more users associated with the disabled vehicle based on user input; determining a second destination of the disabled vehicle based on the user input; analyzing the user input and generating a list of rescue plans; transmitting the list of rescue plans to the one or more users; receiving an identity of a rescue plan selected by the one or more users; sending instructions to a service provider associated with the selected rescue plan to deliver the one or more users to the first destination and the disabled vehicle to the second destination.

According to another embodiment of the present invention, a computer program product is provided. The computer program product comprising: one or more computer readable storage devices and program instructions stored on the one or more computer readable storage devices, the stored program instructions comprising: program instructions to receive a request from a disabled vehicle; program instructions to determine at least a first destination of one or more users associated with the disabled vehicle based on user input; program instructions to determine a second destination of the disabled vehicle based on the user input; program instructions to analyze the user input and generate a list of rescue plans; program instructions to transmit the list of rescue plans to the one or more users; program instructions to receive an identity of a rescue plan selected by the one or more users; program instructions to send instructions to a service provider associated with the selected rescue plan to deliver the one or more users to the first destination and the disabled vehicle to the second destination.

According to another embodiment of the present invention, a computer system is provided. The computer system comprising: one or more computer processors; one or more computer readable storage devices; program instructions stored on the one or more computer readable storage devices for execution by at least one of the one or more computer processors, the stored program instructions comprising: program instructions to receive a request from a disabled vehicle; program instructions to determine at least a first destination of one or more users associated with the disabled vehicle based on user input; program instructions to determine a second destination of the disabled vehicle based on the user input; program instructions to analyze the user input and generate a list of rescue plans; program instructions to transmit the list of rescue plans to the one or more users; program instructions to receive an identity of a rescue plan selected by the one or more users; program instructions to send instructions to a service provider associated with the selected rescue plan to deliver the one or more users to the first destination and the disabled vehicle to the second destination.

DETAILED DESCRIPTION

Figure 1:
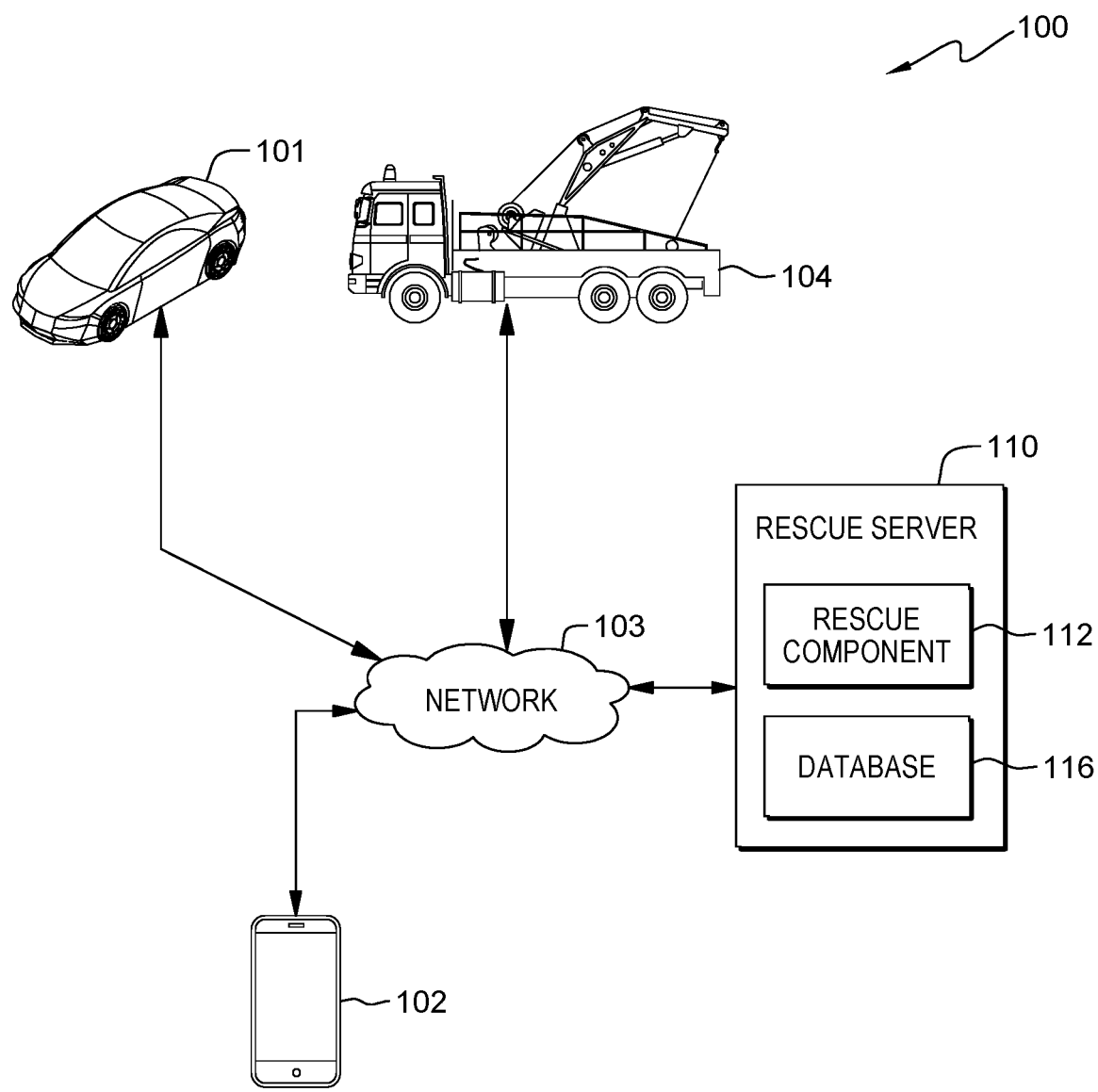
FIG. 1 is a functional block diagram illustrating the vehicle rescue environment, designated as 100, in accordance with an embodiment of the present invention.

Embodiments of the present invention recognize that providing an uninterrupted trip to a destination can be realized by the use of a novel road side assistance service that offers towing of the disabled vehicle and a substitute vehicle.

One embodiment, a system and a method are proposed using a bidding and partial route fulfillment by autonomous or non-autonomous vehicles to assist other vehicles on the road. For example, John Smith is traveling from Washington D.C. (DC) to New York City (NYC) via a non-autonomous vehicle to give a presentation. Unfortunately, the vehicle suffers an engine failure halfway on the road. John Smith has to figure out what to do with his vehicle and his presentation (less than 24 hours away) in New York City. John Smith can invoke a client application (i.e., the present invention) on his smart mobile device to find a solution that will address his two issues: broken-down vehicle and completing his trip to NYC. The client application, in the present embodiment, along with main server has the ability to analyze available tow truck service and a trip substitute service (i.e., vehicle rentals, ride-sharing, etc.) and present the list to John Smith to choose. John Smith choses Broken-Down Trip Inc. amongst the list of vendors. Broken-down Trip Inc. sends a tow truck and an autonomous vehicle to John Smith's location. The tow truck will take John's disabled vehicle back to his "home" garage (i.e., setup on his application profile) in DC and the autonomous vehicle will take John to NYC in time for his presentation.

In another embodiment, a vehicle is carrying an important package to the final destination. However, the vehicle (i.e., autonomous or non-autonomous) suffers a transmission issue and is unable to continue. The "driver" can invoke a client application (i.e., the present invention) on his smart device to request solution that will allow the package to arrive at the destination without any delays. In this embodiment, the client application analyzes and offers a list of solutions for the driver to choose in order to continue the trip. One example, a rescue vehicle will handle the delivery of the package and will meet the disabled vehicle to take possession of the package. In another example, another rescue vehicle will carry/tow the disabled vehicle along with the package to the final destination.

Detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1 is a functional block diagram illustrating the vehicle rescue environment, designated as 100, in accordance with an embodiment of the present invention.

FIG. 1 is a functional block diagram illustrating the vehicle rescue environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Vehicle rescue environment 100 includes rescue server 110, client vehicle 101, mobile device 102 and rescue vehicle 104, all interconnected over network 103.

Client vehicle 101 in the present embodiment is the disabled vehicle of the user. Client vehicle can be autonomous or non-autonomous. Client vehicle 101 can be a one-wheel vehicle or multi-wheel vehicle (e.g., motorcycle, passenger cars, bus, etc.). Client vehicle 101 can also be a vehicle without any wheels and may rely on other methods of propulsion (i.e., flying cars, etc.).

Mobile device 102 can be a mobile computing device, or any other electronic device or computing system capable of receiving, sending, and processing data. Mobile device 102 allows the users (or admins) to access the web services (or any other suitable applications) on rescue server 110. In the depicted environment, mobile device 102 is separated from client vehicle 101. In other embodiments, mobile device 102 can be imbedded/integrated with client vehicle 101.

Public network 103 can be, for example, a telecommunications network, a local area network (LAN), a wide area network (WAN), such as the Internet, or a combination of the three, and can include wired, wireless, or fiber optic connections. Public network 103 can include one or more wired and/or wireless networks that are capable of receiving and transmitting data, voice, and/or video signals, including multimedia signals that include voice, data, and video information. In general, public network 103 can be any combination of connections and protocols that can support communications between rescue server 110, client vehicle 101, mobile device 102 and rescue vehicle 104 and other computing devices (not shown) within vehicle rescue environment 100.

Rescue vehicle 104 of the present embodiment is vehicle (autonomous or non-autonomous) that is capable of towing the disabled vehicle (i.e., client vehicle 101). Rescue vehicle 104 can be a one-wheel vehicle or multi-wheel vehicle (e.g., motorcycle, passenger cars, bus, etc.). Rescue vehicle 104 can also be a vehicle without any wheels and may rely on other methods of propulsion (i.e., flying cars, helicopters, etc.).

Rescue server 110 can be a standalone computing device, a management server, a web server, a mobile computing device, or any other electronic device or computing system capable of receiving, sending, and processing data. In other embodiments, rescue server 110 can represent a server computing system utilizing multiple computers as a server system, such as in a cloud computing environment. In another embodiment, rescue server 110 can be a laptop computer, a tablet computer, a netbook computer, a personal computer (PC), a desktop computer, a personal digital assistant (PDA), a smart phone, or any other programmable electronic device capable of communicating with mobile device 102, and other computing devices (not shown) within vehicle rescue environment 100 via network 103. In another embodiment, rescue server 110 represents a computing system utilizing clustered computers and components (e.g., database server computers, application server computers, etc.) that act as a single pool of seamless resources when accessed within vehicle rescue environment 100. In general, rescue server 110 provides the ability to analyze and mobilize available resources to help client complete the trip. Rescue server 110 includes rescue component 112 and database 116.

Rescue component 112 enables the present invention to analyze and mobilize available resources to help client complete the trip. Rescue component 112 can output a list of potential rescuers for the users to select. In addition, rescue component 112 can direct/instruct autonomous vehicles to aid the stranded user.

Database 116 is a repository for data used by rescue component 112. In the depicted embodiment, database 116 resides on rescue server 110. In another embodiment, database 116 may reside elsewhere within 100, provided that rescue component 112 has access to database 116. A database is an organized collection of data. Database 116 can be implemented with any type of storage device capable of storing data and configuration files that can be accessed and utilized by rescue server 110, such as a database server, a hard disk drive, or a flash memory. Database 116 uses one or more of a plurality of techniques known in the art to store a plurality of information. For example, database 116 may store information associated with the various tow vendors, vehicle specifications, road atlas, garage/mechanic location and vehicle rentals.

Figure 2:
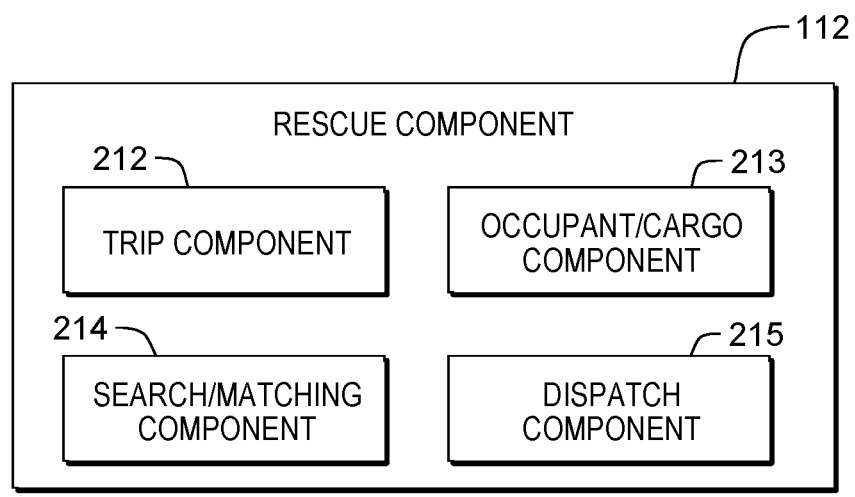
FIG. 2 is a functional block diagram illustrating the use of vehicle rescue component in accordance with an embodiment of the present invention.

FIG. 2 is a functional block diagram illustrating the use of vehicle rescue component in accordance with an embodiment of the present invention. Rescue component 112 includes trip component 212, occupant/cargo component 213, search/matching component 214 and dispatch component 215.

Trip component 212 of the present invention provides the capability of mapping out the route for the user (or packages) to the final destination. In an embodiment, trip component 212 analyzes various route from the location of the disabled vehicle to the final destination. In addition, trip component 212 is able to determine the various location of tow vehicles and location of other available vehicle substitute service. Furthermore, trip component 212 can gather other necessary information such alternative destinations for one or more passengers (or packages). In addition, information about the passenger themselves such as passengers with special needs which may require special vehicle with a ramp.

Occupant/cargo component 213, of the present invention provides the capability of storing and retrieving the profile of the passenger(s), the cargo and the vehicle. The profile of the passenger can include, but is not limited to, a home address, favorite mechanic shop, favorite gas station and favorite car rental. The profile of the cargo (e.g., packages) can include, but is not limited to, a package size, a package weight, a package fragile status, and a package perishable or non-perishable status. The profile of the vehicle can include, but is not limited to, a technical information pertaining to the make and model, gross weight, computer information regarding maintenance information, and vehicle error status.

Search/matching component 214 of the present invention provides the capability of analyzing predefined parameters/criteria and information received from, but is not limited to, database 116, trip component 212 and occupant/cargo component 213 in order to create a list (i.e., rescue plan) of available services (by various vendors or service providers) for the user to select. The predefined parameters/criteria may be selectable by the user before the commencement of the trip. For example, users may have predefined or use the default filter regarding the radius of service provider to be included in the analysis process by search/matching component 214. Other consideration (i.e., search rules) by search/matching component 214 may include the following, but is not limited to, time it will take for the service provider to arrive, the cost estimated by the service provider, how much extra energy is used by the service provider and how much extra travel time from the location of the disabled vehicle to the final destination. Search/matching component 214 may use the search rules to match up with existing data of the service provider. Furthermore, search/matching component 214 may also use social media platform to match with friends and/or family who may be in the vicinity.

In an exemplary embodiment, dispatch component 215 of the present invention provides the capability of transmitting the work order (i.e., selected rescue plan) to the vendor/service providers in order to rescue the stranded traveler. In another embodiment, dispatch component 215 can also transmit commands to autonomous devices and/or vehicles to rescue the traveler as well.

Figure 3:
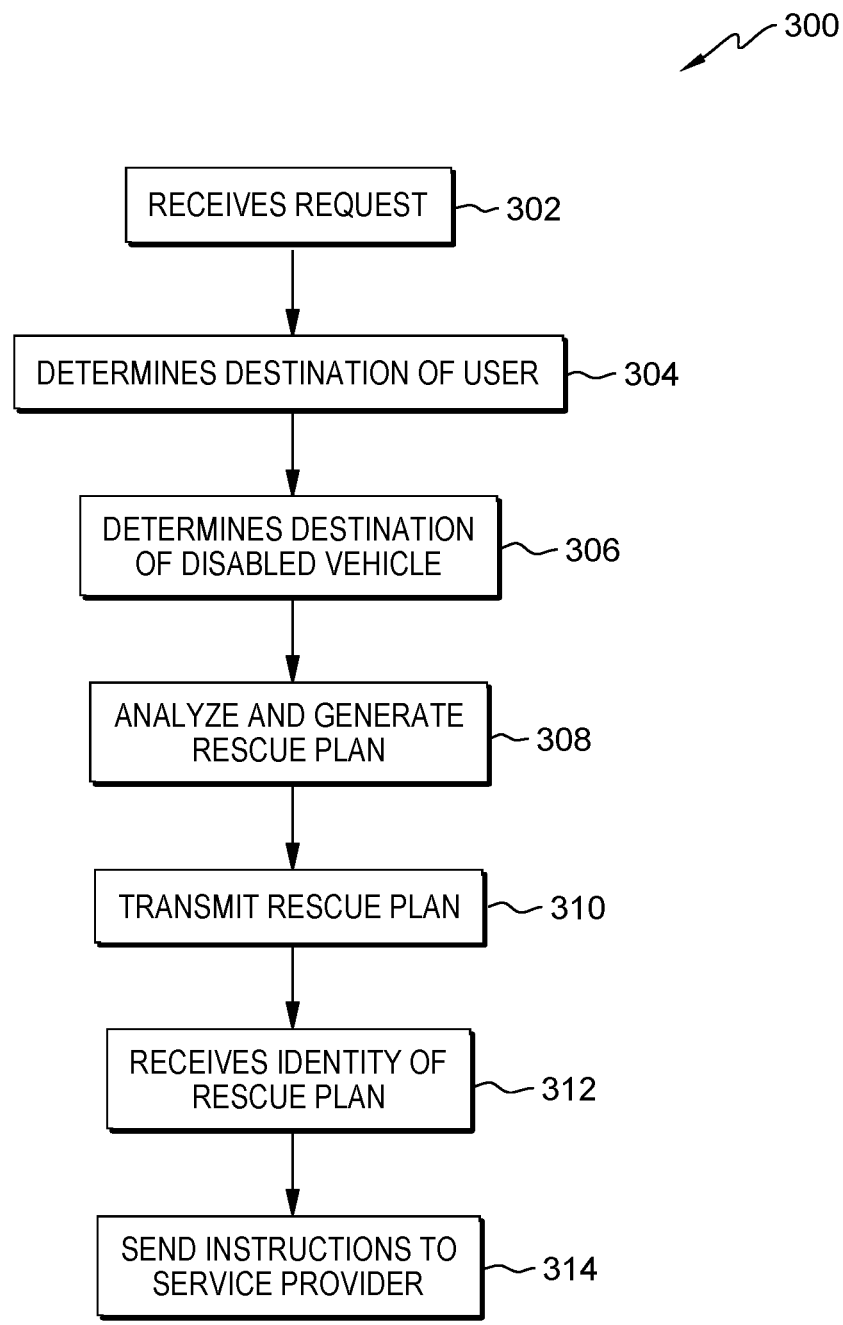
FIG. 3 is a functional block diagram illustrating the use of vehicle rescue component, designated as 300, in accordance with an embodiment of the present invention.

FIG. 3 is a functional block diagram illustrating the use of vehicle rescue component, designated as 300, in accordance with an embodiment of the present invention.

In the depicted embodiment, rescue component 112 receives a request (step 302) for assistance. A user of the disabled vehicle submits a request to rescue component 112 via mobile device 102. For example, Joe Smith activates a client application on his mobile device after his vehicle becomes disabled due to an engine malfunction. Joe Smith can have all of his profile already prefilled before invoking the client application or he can setup a new account profile after downloading the client application. Furthermore, rescue component 112 through occupant/cargo component 213 may request more information regarding the issue such as number of passengers/cargo/packages and type issue (e.g., mechanical, electrical, gas, etc.) with the disabled vehicle. It is noted that the term "user," used throughout the disclosure, can be synonymous with passengers and/or cargo/packages.

In another embodiment, the disabled vehicle may submit request for assistant to rescue component 112 via a built-in, specialized computing device, instead of the mobile device of the user (i.e., mobile device 102). For example, the disabled vehicle is a smart vehicle with self-diagnostic functionality (i.e., Engine Computer Unit module, Transmission Computer Module, individual vehicle control modules, brake system module, etc.) The vehicle detects a loss in brake power and determines an issue with the brake system via sensors which requires immediate assistance. The vehicle can also relay all vehicle related telematics (e.g., GPS, engine RPM, gear selected, transmission pressure and temperature, etc.) along with the profile and preference of the owner to rescue server 110.

In the depicted embodiment, rescue component 112 through trip component 212 determines the destination of the user (step 304). The user may already have the trip preplanned in the client application or the user can type in the destination into the client application UI (user interface). In another embodiment, rescue component 112 may learn of the destination based on the social media posting by the user. For example, user may post on Facebook™ about the excitement of their upcoming trip to NYC.

In another embodiment, rescue component 112 determines the destination of the cargo/packaged based on pre-filled bill of laden or pre-defined coordinate set by the shipper. For example, the user (i.e., the shipper) wishes to send a household goods to his mother in the next town. Therefore, he loads up the goods in an autonomous vehicle and pre-program the coordinates of his mother's house into the vehicle.

In another embodiment, rescue component 112 through occupant/cargo component 213 and trip component 212 may request the number of passengers and/or cargo and their respective destination in case the final destination is not the same for all passengers and/or cargo. For example, Joe Smith and his wife, Jane Smith is on a trip to drop Joe Smith off at the airport (an hour from the house). However, Jane Smith will continue her journey via the same car to her mother's house (a few hours away) after dropping Joe Smith off. Their car breaks down on route to the airport. Joe Smith use the client application on her mobile device to request a rescue from rescue component 112. Rescue component 112 through occupant/cargo component 213 may inquire about the number of passengers and the final destination of each passenger in order to accurately provide the best solution.

In the depicted embodiment, rescue component 112 through trip component 212 determines the destination of the disabled vehicle (step 306). For example, Joe Smith may already have configured his "home" garage (i.e., Garage 1) in the client application. However, if he has not, he may choose to input his rank of available garages in a certain order. In addition, Joe may rank Garage 2 as his second preference if Garage 1 is not available or not nearby his current itinerary route. If Joe does not have any preferred garage saved then rescue component 112 may offer a list of garages (i.e., service stations) based the follow parameters, but is not limited to, proximity to user's home city, proximity to user's final destination, available mechanics, available parts and cost of fixing the vehicle.

In another embodiment, rescue component 112 determines the destination of the autonomous disable vehicle based on the pre-programmed preference of the owner and/or shipper. For example, the shipper may only want the vehicle to be towed to his network of garages.

In an embodiment, rescue component 112 through search/matching component 214 analyzes and generate the list of potential rescuers, i.e., rescue plan (step 308). After receiving various information (i.e., final destination, preferred garage, number of passengers/packages, etc.), rescue component 112 analyzes tow service vendors, vehicle substitute service (i.e., car rental, etc.) from a database (i.e., database 116) and determines a list of available service providers that can fulfil the entire service request (i.e., towing the disabled vehicle and providing a ride or substitute vehicle for the passenger/cargo/package to continue to the final destination) or a partial service request (i.e., only towing the vehicle or only providing a ride or substitute vehicle for the passenger/cargo/package to continue to the final destination). The list of service providers may include the following, but is not limited to, name of service provider, estimated cost of service, type of service available (i.e., tow only, tow and vehicle substitute, vehicle substitute only), estimated arrival time of tow vehicle and/or vehicle substitute, and location of garage (if unable to fulfil the preferred garage list of the user).

In another embodiment, rescue component 112 may analyze social media activities of acquaintances of the user and may solicit assistance from a friend that is nearby. For example, rescue component 112 recognizes that friend A of the user is traveling along the same route as the user and is 15 miles behind. Rescue component 112 may send a request to a friend via social media platform to alert them that the user is stranded along the same route and may prompt a friend A to help. If friend A decides to help (i.e., accept the request from rescue component 112), then rescue component 112 will display that friend on the generated list available for the user.

In an embodiment, rescue component 112 transmit the rescue plan to the user (decision block 310). Rescue component 112 compiles the generated list of rescue plan from step 308 and transmits to the user via mobile device 102. In another embodiment, the list can be transmitted to an autonomous vehicle of the user.

In an embodiment, rescue component 112 receives the identity of the rescue plan (step 312). The user may choose one or more available service provider from the list produced by rescue component 112 by pressing the corresponding selection via mobile device 102 or on the screen of the disabled vehicle. The user may select one service provider if the provider is a "one stop shop" on mobile device 102 in order to finalize the rescue (i.e., tow truck, delivery of rental vehicle, etc.), proceeding to step 314. For example, Joe Smith may pick We Tow You Drive LLC since they can tow his car to his preferred destination and provide a rental vehicle at the same transaction and location. Otherwise, user may choose from several service providers from the list presented by rescue component 112. For example, Joe Smith may choose We Tow LLC and You Drive LLC (two separate service provider) due to the lack of available "one stop shop" service provider in the area of the disable vehicle. However, users may also reject the entire list provided by rescue component 112 during the initial analysis. The users may not be keen to the long-estimated arrival time or the available garage location. Therefore, the users may reject all providers and change the filter parameters so that rescue component 112 can recalculate with new information (back to step 308). For example, Joe Smith may change/update his preferred garage list to include his final destination so that his vehicle will be ready by the time he is done with his NYC trip.

In another embodiment, the disabled autonomous vehicle may pick from the list of potential rescue services based on the pre-programmed preference by the owner. If the autonomous vehicle is unable to make the decision, then it will ask for guidance from a human (user and/or owner).

In an embodiment, rescue component 112 acknowledges the user selection and transmits the information to the rescuer/service provider (step 314). After the user makes his selection, the rescuer/service provider is notified and send rescue vehicle 104 via rescue component 112 through dispatch component 215. For example, Joe Smith may pick We Tow You Drive LLC since they can tow his car to his preferred destination and provide a rental vehicle at the same transaction and location. We Tow You Drive LLC would send rescue vehicle 104 (i.e., flatbed tow truck loaded with a rental vehicle in tow). Upon arriving at Joe Smith's location (i.e., disabled vehicle location or GPS pickup coordinate location sent by Joe Smith), We Tow You Drive LLC would unload the rental vehicle for Joe Smith to use and then load the disabled vehicle to its final destination. In addition, payment information between the user and service provide can be pre-arranged in the background by rescue component 112 after the user selects the service provider. It is noted that some assistance may not require payment. For example, friend A, who may be making a separate trip but is following the same route as the user may decide to give the user a ride for free.

Figure 4:
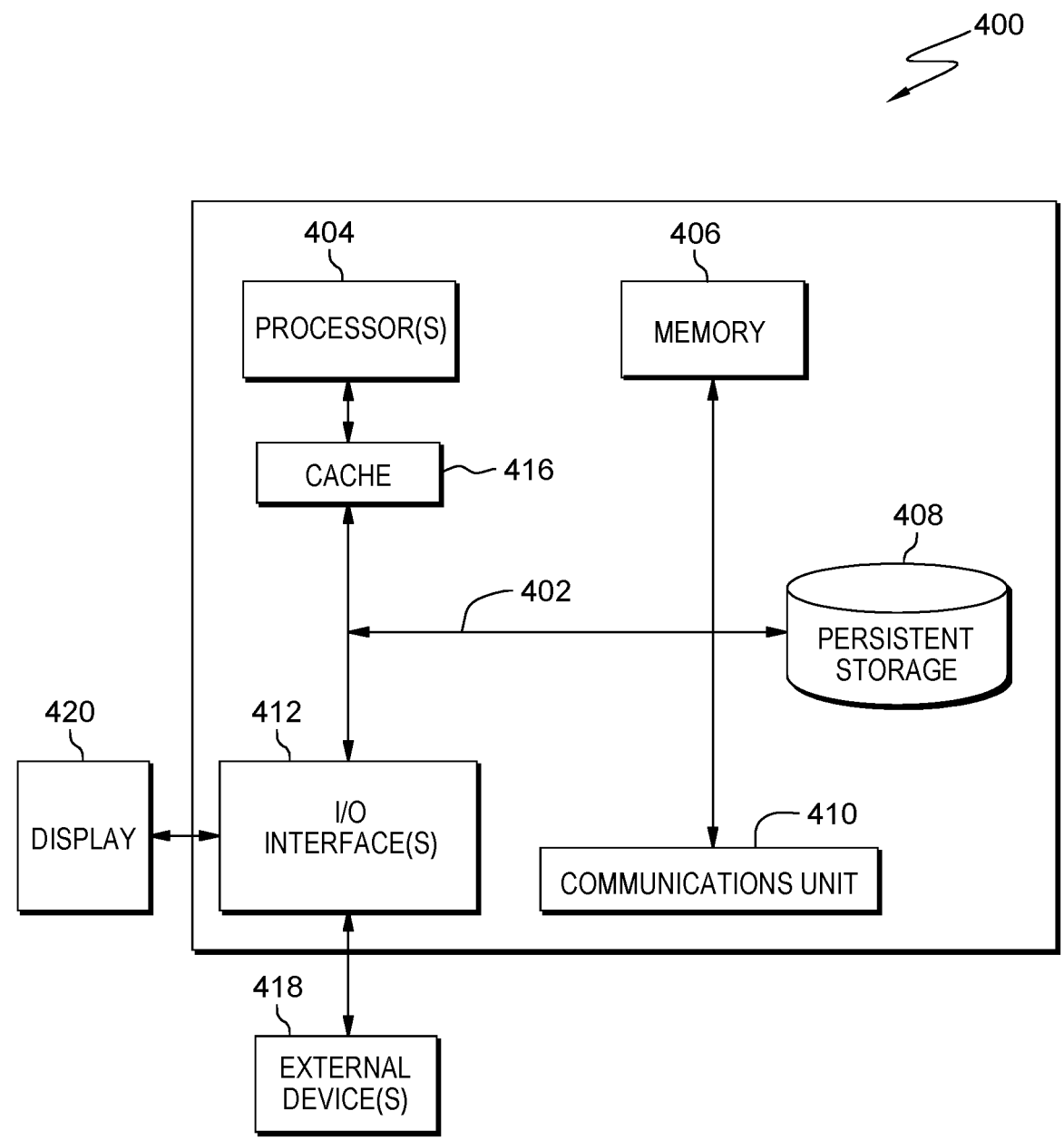
FIG. 4 depicts a block diagram, designated as 400, of components of the server computer executing the program within the vehicle rescue environment, FIG. 1, in accordance with an embodiment of the present invention.

FIG. 4 depicts a block diagram, designated as 400, of components of the server computer executing the program within the vehicle rescue environment of FIG. 1, in accordance with an embodiment of the present invention.

Rescue server 110 can include processor(s) 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processor(s) 404 by holding recently accessed data, and data near recently accessed data, from memory 406.

Program instructions and data used to practice embodiments of the present invention, e.g., rescue component 112 and database 116, can be stored in persistent storage 408 for execution and/or access by one or more of the respective processor(s) 404 of rescue server 110 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of rescue server 110. In these examples, communications unit 410 includes one or more network interface cards. Communications unit 410 may provide communications through the use of either or both physical and wireless communications links. Rescue component 112 and database 116 may be downloaded to persistent storage 408 of rescue server 110 through communications unit 410.

I/O interface(s) 412 allows for input and output of data with other devices that may be connected to rescue server 110. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., rescue component 112 and database 116 on rescue server 110, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor or the lenses of a head mounted display. Display 420 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for completing travel plans after a personal vehicle failure, the method comprising:
   receiving a request from a disabled vehicle through a social media platform from one or more users;
   determining a route of the one or more users associated with the disabled vehicle based on the one or more users input, wherein the route includes at least a first destination;
   determining a second destination of the disabled vehicle based on the one or more users input;
   determining one or more travelers is traveling along the route of the one or more users;
   transmitting a help request to the one or more travelers through the social media platform;
   responsive to a positive response to the help request from the one or more travelers, generating a friend's rescue list to include one or more names of the one or more travelers;
   analyzing the one or more users input and generating a list of rescue plans, wherein the list of rescue plans comprises of a list of bids from one or more service providers and the friend's rescue list;
   transmitting the list of rescue plans to the one or more users;
   receiving an identity of a rescue plan selected by the one or more users;
   sending instructions to the one or more service providers associated with the selected rescue plan to deliver the disabled vehicle to the second destination; and
   assisting the one of or more users by the one or more travelers traveling to the first destination of the one or more users, wherein the one or more travelers provides transportation to the one or more users of the disabled vehicle to the first destination.

2. The method of claim 1, further comprising:
   determining a third destination for a subset of the one or more users not going to the first destination.

3. The method of claim 2, wherein analyzing the user input and generating a list of rescue plans, further comprises:
   retrieving a plurality of parameters from a data source, wherein the plurality of parameters comprise a set of search rules;
   retrieving diagnostic information from the disabled vehicle;
   determining the list of rescue plans based on the plurality of parameters, the first destination, the second destination, the third destination and the diagnostic information; and
   generating the list of rescue plans.

4. The method of claim 3, wherein the search rules, further comprises one or more of a time it will take for the service provider to arrive, a cost estimated by the service provider, a travel time from the location of the disabled vehicle to the final destination a travel time for the one or more users and a radius of the service provider.

5. The method of claim 1, wherein the user input is at least one of retrieved from a preconfigured user profile or dynamically input by the user based on the disabled vehicle.

6. The method of claim 1, wherein sending instructions to a service provider, further comprises:
   dispatching the one or more rescuers, wherein the one or more rescuers comprises an autonomous vehicle.

7. The method of claim 1, further comprising:
   determining if the disabled vehicle comprises one or more packages;
   responsive to determining the disabled vehicle comprises one or more packages, delivering the one or more packages to an address associated with the one or more packages, respectively.

8. A computer program product for completing travel plans after a personal vehicle failure, the computer program product comprising:
   one or more computer readable and non-transitory storage devices and program instructions stored on the one or more computer readable and non-transitory storage devices, the stored program instructions comprising:
   program instructions to receive a request from a disabled vehicle through a social media platform from the one or more users;
   program instructions to determine a route at least a first destination of the one or more users associated with the disabled vehicle based on the one or more users input, wherein the route includes at least a first destination;

program instructions to determine a second destination of the disabled vehicle based on the one or more users input;
program instructions to determine one or more travelers is traveling along the route of the one or more users;
program instructions to transmit a help request to the one or more travelers through the social media platform;
responsive to a positive response to the help request from the one or more travelers, program instructions to generate a friend's rescue list to include one or more names of the one or more travelers;
program instructions to analyze the one or more users input and generate a list of rescue plans, wherein the list of rescue plans comprises of a list of bids from one or more service providers and the friend's rescue list;
program instructions to transmit the list of rescue plans to the one or more users;
program instructions to receive an identity of a rescue plan selected by the one or more users;
program instructions to send instructions to the one or more service providers associated with the selected rescue plan to deliver the disabled vehicle to the second destination; and
program instructions to assist the one or more users by the one or more travelers traveling to the first destination of the one or more users, wherein the one or more travelers provides transportation to the one or more users of the disabled vehicle to the first destination.

9. The computer program product of claim 8, further comprising:
program instructions to determine a third destination for a subset of the one or more users not going to the first destination.

10. The computer program product of claim 9, wherein analyze the user input and generate a list of rescue plans, further comprises:
program instructions to retrieve a plurality of parameters from a data source, wherein the plurality of parameters comprise a set of search rules;
program instructions to retrieve diagnostic information from the disabled vehicle;
program instructions to determine the list of rescue plans based on the plurality of parameters, the first destination, the second destination, the third destination and the diagnostic information; and
program instructions to generate the list of rescue plans.

11. The computer program product of claim 10, wherein the search rules, further comprises one or more of a time it will take for the service provider to arrive, a cost estimated by the service provider, a travel time from the location of the disabled vehicle to the final destination a travel time for the one or more users and a radius of the service provider.

12. The computer program product of claim 8, further comprising:
program instructions to determine if the disabled vehicle comprises one or more packages;
responsive to determine the disabled vehicle comprises one or more packages, program instructions to deliver the one or more packages to an address associated with the one or more packages, respectively.

13. The computer program product of claim 8, wherein the user input is at least one of retrieved from a preconfigured user profile or dynamically input by the user based on the disabled vehicle.

14. The computer program product of claim 8, wherein send instructions to a service provider, further comprises:
program instructions to dispatch the one or more rescuers, wherein the one or more rescuers comprises an autonomous vehicle.

15. A computer system for completing travel plans after a personal vehicle failure, the computer system comprising:
one or more computer processors;
one or more computer readable storage devices;
program instructions stored on the one or more computer readable storage devices for execution by at least one of the one or more computer processors, the stored program instructions comprising:
program instructions to receive a request from a disabled vehicle through a social media platform from the one or more users;
program instructions to determine a route of the one or more users associated with the disabled vehicle based on the one or more users input, wherein the route includes at least a first destination;
program instructions to determine a second destination of the disabled vehicle based on the one or more users input;
program instructions to determine one or more travelers is traveling along the route of the one or more users;
program instructions to transmit a help request to the one or more travelers through the social media platform;
responsive to a positive response to the help request from the one or more travelers, program instructions to generate a friend's rescue list to include one or more names of the one or more travelers;
program instructions to analyze the one or more users input and generate a list of rescue plans, wherein the list of rescue plans comprises of a list of bids from one or more service providers and the friend's rescue list;
program instructions to transmit the list of rescue plans to the one or more users;
program instructions to receive an identity of a rescue plan selected by the one or more users; and
program instructions to send instructions to the one or more service providers associated with the selected rescue plan to deliver the disabled vehicle to the second destination; and
program instructions to assist the one of or more users by the one or more travelers traveling to the first destination of the one or more users, wherein the one or more travelers provides transportation to the one or more users of the disabled vehicle to the first destination.

16. The computer system of claim 15, further comprising:
program instructions to determine a third destination for a subset of the one or more users not going to the first destination.

17. The computer system of claim 16, wherein analyze the user input and generate a list of rescue plans, further comprises:
program instructions to retrieve a plurality of parameters from a data source, wherein the plurality of parameters comprise a set of search rules;
program instructions to retrieve diagnostic information from the disabled vehicle;
program instructions to determine the list of rescue plans based on the plurality of parameters, the first destination, the second destination, the third destination and the diagnostic information; and
program instructions to generate the list of rescue plans.

18. The computer system of claim 17, wherein the search rules, further comprises one or more of a time it will take for the service provider to arrive, a cost estimated by the service provider, a travel time from the location of the disabled vehicle to the final destination a travel time for the one or more users and a radius of the service provider.

19. The computer system of claim 15, further comprising:
program instructions to determine if the disabled vehicle comprises one or more packages;
responsive to determine the disabled vehicle comprises one or more packages, program instructions to deliver the one or more packages to an address associated with the one or more packages, respectively.

20. The computer system of claim 15, wherein send instructions to a service provider, further comprises:
program instructions to dispatch the one or more rescuers, wherein the one or more rescuers comprises an autonomous vehicle.

\* \* \* \* \*